(12) United States Patent
Saito et al.

(10) Patent No.: US 8,000,210 B2
(45) Date of Patent: Aug. 16, 2011

(54) QUARTER-WAVE PLATE, AND OPTICAL PICKUP DEVICE

(75) Inventors: Makiko Saito, Mitaka (JP); Osamu Masuda, Machida (JP)

(73) Assignee: Konica Minolta Holdings, Inc., Tokyo (JP)

( * ) Notice: Subject to any disclaimer, the term of this patent is extended or adjusted under 35 U.S.C. 154(b) by 321 days.

(21) Appl. No.: 12/303,314

(22) PCT Filed: Jun. 4, 2007

(86) PCT No.: PCT/JP2007/061273

§ 371 (c)(1),
(2), (4) Date: Dec. 3, 2008

(87) PCT Pub. No.: WO2007/142179

PCT Pub. Date: Dec. 13, 2007

(65) Prior Publication Data

US 2009/0196152 A1    Aug. 6, 2009

(30) Foreign Application Priority Data

Jun. 7, 2006 (JP) ................................. 2006-158265

(51) Int. Cl.
*G11B 7/00* (2006.01)
(52) U.S. Cl. .................................. 369/112.23; 359/500
(58) Field of Classification Search ............. 369/112.23; 359/500
See application file for complete search history.

(56) References Cited

FOREIGN PATENT DOCUMENTS

| JP | 62-170902 A | | 7/1987 |
|---|---|---|---|
| JP | 2003-207636 A | | 7/2003 |
| JP | 2003207636 A | * | 7/2003 |
| JP | 2004-145064 A | | 5/2004 |
| JP | 2004145064 A | * | 5/2004 |
| JP | 2004-170623 A | | 6/2004 |
| JP | 2004170623 A | * | 6/2004 |
| JP | 2005-010377 A | | 1/2005 |
| JP | 2005010377 A | * | 1/2005 |
| JP | 2005-259235 A | | 9/2005 |
| JP | 2005-338638 A | | 12/2005 |

OTHER PUBLICATIONS

English Language International Search Report dated Aug. 28, 2007 issued in parent Appln. No. PCT/JP2007/061273.

* cited by examiner

*Primary Examiner* — Wayne R Young
*Assistant Examiner* — Brenda Bernardi
(74) *Attorney, Agent, or Firm* — Holtz, Holtz, Goodman & Chick PC

(57) ABSTRACT

A quarter-wave plate includes a base member including a ridge and trough periodic structure with a structural period of $\lambda_{min}/2 < P < \lambda_{min}$ arranged on one side of the base member, where $\lambda_{min}$ is the minimum wavelength among the wavelengths of a plurality of light fluxes which pass the quarter-wave plate. In the quarter-wave plate, refractive index of a ridge portion of the ridge and trough periodic structure for the wavelength $\lambda_{min}$ and a light transmittance have predetermined values. The ridge and trough periodic structure satisfies the predetermined condition relating to the structural height and the structural width of the ridge portion.

13 Claims, 3 Drawing Sheets

QUARTER-WAVE PLATE, AND OPTICAL PICKUP DEVICE

This application is a U.S. National Phase Application under 35 USC 371 of International Application PCT/JP2007/061273 filed Jun. 4, 2007.

TECHNICAL FIELD

The present invention relates to a form birefringence quarter-wave plate having a ridge and trough periodic structure on one side of a base member, and to an optical pickup device including the quarter-wave plate.

BACKGROUND ART

Patent Document 1 (Unexamined Japanese Patent Application Publication No. 2003-207636) proposes a wave plate that can be used in common for two light fluxes each having a different wavelength, through form birefringence. According to this Patent Document 1, this wave plate is formed through a microscopic periodic structure whose size is a half or less of a wavelength of a target light flux, and the wave plate has the form birefringence that changes the state of polarization of two light fluxes each having a different wavelength, thereby, a wave plate capable of coping with two wavelengths such as, for example, 405 nm and 660 nm can be realized. The microscopic periodic structure whose structural period is 200 nm, duty ratio is 0.64 and structural height is 6000 nm is described in the example in the Patent Document 1.

DISCLOSURE OF INVENTION

Problems to be Solved by the Present Invention

The form birefringence wave plate has characteristics that optical performances exhibited by the form birefringence wave plate can be controlled by using a dimension of a ridge and trough periodic structure. However, if the structural period is greater than a wavelength of a light flux to be used, form birefringence does not come into effect. Further, if a structural period is close to the wavelength, undesirable diffraction is caused by the ridge and trough periodic structure, though the form birefringence comes into effect, which makes it difficult to obtain a high zeroth-order light transmittance. Until now, there have been proposed many form birefringence wave plates each having a microscopic periodic structure whose size is a half or less of a wavelength of a light flux, like that in Patent Document 1. However, a wave plate having dimensions of the structural period like that in the aforesaid Patent Document 1, for example, requires extremely difficult processing.

In Patent Document 1, there is realized a wave plate capable of coping with two wavelengths such as 405 nm and 660 nm. However, in recent years, there is required an optical disc device capable of coping with three types of optical discs, representing, for example, 405 nm used for a high density optical disc, 650 nm used for DVD and 780 nm used for CD, and it is not easy to secure uniform phase-difference characteristics in a broader wavelength band including the wavelengths.

Taking the aforesaid problems in the prior art, an object of the invention is to provide a form birefringence quarter-wave plate wherein a structural period of a ridge and trough periodic structure is relatively great and its processing is easy, a uniform phase difference characteristic is developed in a broad wavelength band, and high light transmittance can be obtained. Further, another object is to provide an optical pickup device, wherein even if the optical pickup device uses plural wavelengths which are different from each other greatly, a loss of light with each wavelength is less and utilization efficiency for light with each wavelength is high, by providing the quarter wave plate.

Means to Solve the Problems

To achieve the aforesaid objects, a quarter-wave plate relating to the invention is a quarter-wave plate transmitting a plurality of light fluxes with wavelengths being different from each other. The quarter-wave plate comprises: a base member comprising a ridge and trough periodic structure with a structural period of $\lambda_{min}/2<P<\lambda_{min}$ arranged on one side of the base member, where $\lambda_{min}$ is a minimum wavelength among the plurality of wavelengths. A refractive index $n_{min}$ of a ridge portion of the ridge and trough periodic structure for the wavelength $\lambda_{min}$ satisfies $1.5<n_{min}<1.6$. A light transmittance of the quarter-wave plate for the wavelength $\lambda_{min}$ is 85% or more. The ridge and trough periodic structure satisfies the following expression (1).

$$H = 3.5 \times f - 5.65 \times n_{min} + 8.55 + \alpha \quad (1)$$

$(-0.35 \leq \alpha \leq +0.35)$

In the expression, P is a structural period of the ridge and trough periodic structure, H is a structural height [μm] of the ridge portion, L is a structural width of the ridge portion, and f is a filling factor (=L/P).

According to the quarter-wave plate, structural period P of the ridge and trough periodic structure is within a range of $l_{min}/2<P<l_{min}$, which is greater in size when compared with conventional one having a microscopic periodic structure whose size is a half or less of a wavelength, thereby, it makes processing of a wave plate to be easy. Further, by selecting a dimension of the ridge and trough periodic structure satisfying the aforesaid expression (1) so that a light transmittance may become high, phase difference characteristics which are uniform in a relatively broad wavelength band can be developed, thus, a quarter-wave plate having broad band property and high light transmittance can be realized. Owing to this, it is possible to obtain a quarter-wave plate with uniform phase difference characteristics and high light transmittance characteristics in a broad wavelength band such as, for example, 380 nm-820 nm. For example, it realizes performances which provides phase differences within 90±3 deg (for wavelength 405 nm), 90±10 deg (for wavelength 650 nm), and 90±15 deg (for wavelength 780 nm), and provides transmittance of zeroth-order light of 85% or higher (for all wavelengths).

It is further preferable that the aforesaid filling factor (f) is 0.6 or more, and is 0.75 or less, and whereby, the ridge and trough periodic structure is formed more easily.

It is further preferable that a ridge portion of the ridge and trough periodic structure comprises resin. Due to this, it is possible to form a quarter-wave plate through molding by a die. Thus, it makes mass production easy and cost reduction can be realized. Further, it is preferable that the trough portion of the ridge and trough periodic structure comprises air (index of refraction n=1). Due to this, it is possible to lower the structural height (H) of the ridge portion, whereby the ridge and trough periodic structure can be formed even more easily.

Further, when an upper portion of the ridge and trough periodic structure is covered by a member having a refractive index being different from the refractive index of the aforesaid base member, an effect of preventing reflection on the upper part of the ridge and trough periodic structure and an effect of preventing dirt on the ridge and trough periodic structure can be expected. In addition, a ridge and trough periodic structure or a coating layer for preventing reflection can further be provided on the other side of the aforesaid base member. This is preferable because transmittance of the zeroth-order light is improved by the effect of preventing reflection.

Further, to achieve the above objects, an optical pickup device relating to the present invention is an optical pickup device comprising: a light source for emitting light fluxes with a plurality of wavelengths being different from each other; an objective lens for converging each of the light fluxes emitted by the light source onto a recording surface of an information recording medium; a light-receiving element for receiving a light flux reflected by the recording surface of the information recording medium; and a quarter-wave plate arranged between the objective lens and the light-receiving element. The quarter-wave plate comprises a base member which comprises a ridge and trough periodic structure with a structural period of $\lambda_{min}/2 < P < \lambda_{min}$ arranged on one side of the base member, where $\lambda_{min}$ is a minimum wavelength among the plurality of wavelengths. A refractive index $n_{min}$ of a ridge portion of the ridge and trough periodic structure for the wavelength $\lambda_{min}$ satisfies $1.5 < n_{min} < 1.6$. A light transmittance of the quarter-wave plate for the wavelength $\lambda_{min}$ is 85% or more. The ridge and trough periodic structure satisfies the following expression (1).

$$H = 3.5 \times f - 5.65 \times n_{min} + 8.55 + \alpha \quad (1)$$

$(-0.35 \leq \alpha \leq +0.35)$

In the expression, P is a structural period of the ridge and trough periodic structure, H is a structural height [μm] of the ridge portion, L is a structural width of the ridge portion, and f is a filling factor (=L/P).

Further, it is preferable that each of the plurality of wavelengths is within a range of 380 nm to 820 nm.

Further, it is also preferable that each of the plurality of wavelengths is within 400 nm±20 nm, 650 nm±20 nm, or 790 nm±30 nm.

It is preferable that the aforesaid filling factor (f) is 0.6 or more and 0.75 or less, and whereby, it is easier to form the ridge and trough periodic structure.

It is preferable that a ridge portion of the ridge and trough periodic structure comprises resin. Due to this, it is possible to form a quarter-wave plate through molding by a die. Thus, it makes mass production easy and cost reduction can be realized. Further, it is preferable that the trough portion of the ridge and trough periodic structure comprises air (index of refraction n=1). Due to this, it is possible to lower the structural height (H) of the ridge portion, whereby the ridge and trough periodic structure can be formed even more easily.

Further, when an upper portion of the ridge and trough periodic structure is covered by a member that is different from the aforesaid base member in terms of refractive index, an effect of preventing reflection on the upper part of the ridge and trough periodic structure and an effect of preventing dirt on the ridge and trough periodic structure can be expected. In addition, a ridge and trough periodic structure or a coating layer for preventing reflection can also be provided on the other side of the aforesaid base member. This is preferable because transmittance of the zeroth-order light is improved by the effect of preventing reflection.

Effects of the Invention

According to the quarter-wave plate, a structural period of the ridge and trough periodic structure can provide relatively large size, easy processability, uniform phase difference characteristics within a broad wavelength band, and high transmittance.

According to the optical pickup device, even when the quarter-wave plate uses plural wavelengths which are different greatly from each other, the optical pickup device includes a quarter-wave plate with uniform phase difference characteristics and with high transmittance for each wavelength, developed in a broad wavelength band. Thereby, it is possible to obtain an optical pickup device with smaller loss of light and high light utilization efficiency.

Figure 1:
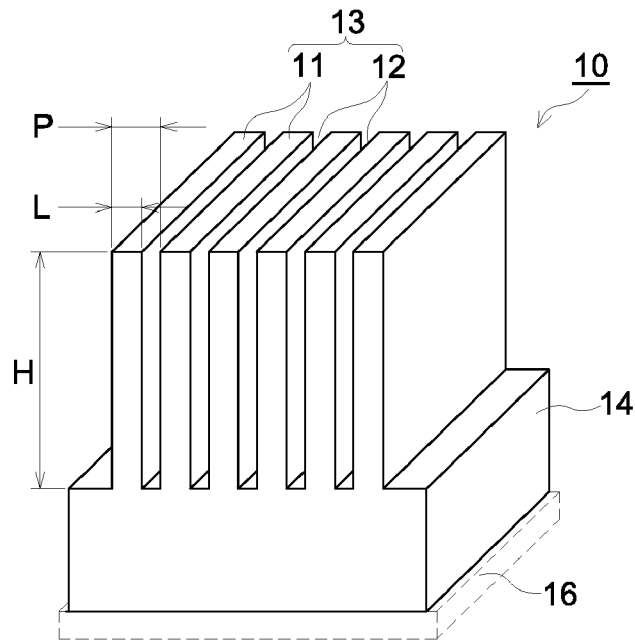
FIG. 1 is a perspective view of primary parts schematically showing a form birefringence quarter-wave plate in the present embodiment.

EXPLANATION OF NOTATION 10, 10' Quarter-wave plate
11 Ridge portion
12 Trough portion
13 Ridge and trough periodic structure section
14 Base member
15 Cover member
16 Coating layer
H Structural height of ridge portion
L Structural width of ridge portion
P Structural period of ridge and trough periodic structure section
PU optical pickup device
CL Collimating optical system
CS Polarization beam splitter
DP Optical path compound prism
LD1, LD2, LD3 Laser light source
OL Objective optical system
PD Light-receiving element
QWP Form birefringence quarter-wave plate
SL Sensor optical system

BEST MODE FOR CARRYING OUT THE INVENTION

Figure 2:
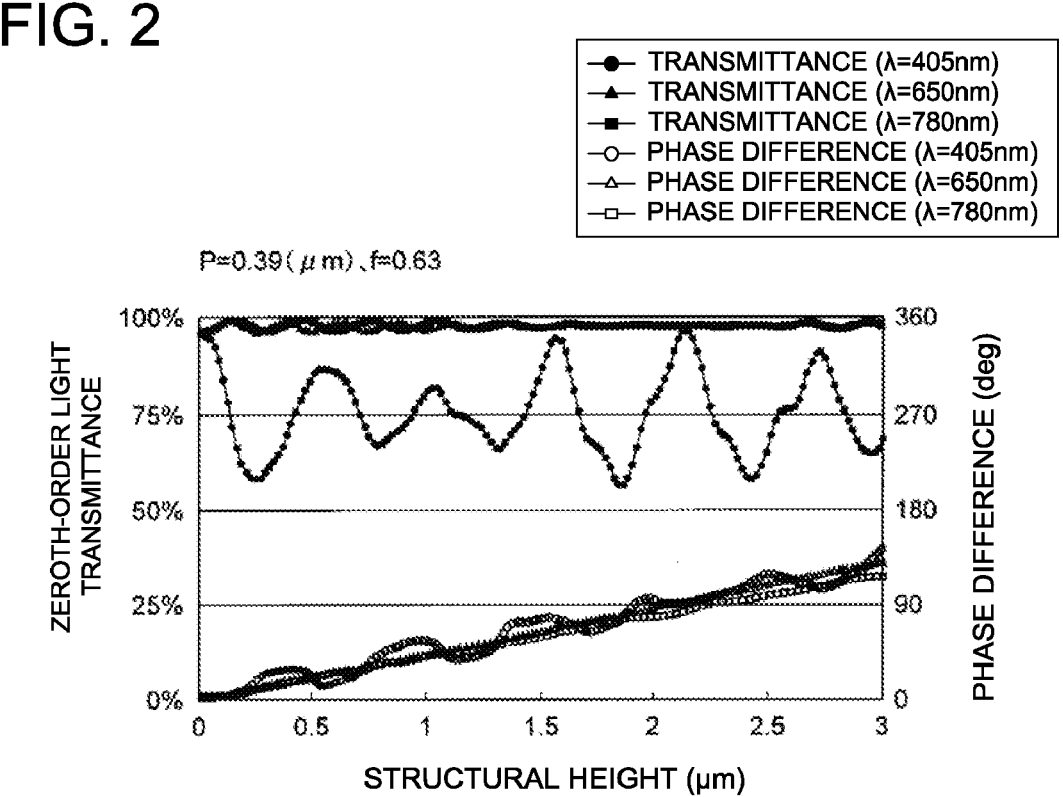
FIG. 2 is a diagram showing a relationship between transmittance of zeroth-order light and structural height H as well as a relationship between a phase difference and structural height H, for respective light fluxes with wavelengths of 405 nm, 650 nm and 780 nm, in the quarter-wave plate in FIG. 1 which has the ridge and trough periodic structure with P=0.39 μm and filling factor f (=L/P)=0.63.

The best mode for carrying out the invention will be explained as follows, referring to the drawings. FIG. 1 is a perspective view of primary parts schematically showing a form birefringence quarter-wave plate in the present embodiment. FIG. 2 is a diagram showing a relationship between zeroth-order light transmittance and structural height H, and a relationship between a phase difference and structural height H, for light fluxes with wavelengths of 405 nm, 650 nm and 780 nm, respectively, under the condition that the quarter-wave plate in FIG. 1 includes the ridge and trough periodic structure with P=0.39 μm and filling factor f (=L/P)=0.63.

Form birefringence quarter-wave plate 10 shown in FIG. 1 is equipped with ridge and trough periodic structure section 13 in which plural resin ridge portions 11 and plural trough portions 12 filled with air (refractive index n=1) are periodically formed on one side of the base member 14. The ridge and trough periodic structure section 13 has structural period P, structural height H of ridge portion 11 and structural width L of ridge portion 11.

Optical resin materials such as polyolefin resin and norbornane type resin are preferable as resin constituting the ridge portions 11, and in concrete terms, APEL made by Mitsui Chemicals, Inc., ARTON made by JSR Corporation, ZEONOR and ZEONEX made by ZEON Corporation, for example, can be used. A refractive index for wavelength 405 nm of each of these resins is within a range of 1.5-1.6. Incidentally, base member 14 may also be constituted with the same resin.

When quarter-wave plate 10 in FIG. 1 includes ridge and trough periodic structure with P=0.39 μm and with filling factor f (=L/P)=0.63, and employs, for example, ZEONEX (XEON Corporation) as resin material, it is found that transmittance of zeroth-order light of this quarter-wave plate 10 for wavelength 405 nm periodically varies with structural height H as is shown in FIG. 2. Therefore, dimensions of the ridge and trough periodic structure that can provide high transmittance of zeroth-order light with wavelength 405 nm are limited.

Further, it is necessary to provide the phase difference satisfying the desired value within a working wavelength range, for this quarter-wave plate 10 to function as a wavelength plate for broader wavelength range. However, the phase difference also depends on each dimension P, f and H of the ridge and trough periodic structure. Therefore, dimensions of the ridge and trough periodic structure that satisfies both the desired phase difference and high transmittance of the zeroth-order light within a broad wavelength band are further limited.

In the form birefringence quarter-wave plate 10 of the present embodiment, structural period P of the ridge and trough periodic structure is within a range of $\lambda_{min}/2<P<\lambda_{min}$, where the wavelength $\lambda_{min}$ is the shortest wavelength in the working wavelength range. It determines respective dimensions of the ridge and trough periodic structure so that a desired phase difference and a high transmittance of the zeroth-order light may be obtained. Incidentally, an example of the aforesaid transmittance of the zeroth-order light is 85%.

If respective dimensions of the ridge and trough periodic structure that satisfies the following expression (1) are selected so that transmittance of the zeroth-order light may become high (for example, 85% or more), it is possible to obtain a quarter-wave plate that has capabilities such that phase differences is within 90±3 deg (for wavelength 405 nm), 90±10 deg (for wavelength 650 nm), and 90±15 deg (for wavelength 780 nm) and transmittance of zeroth-order light is 85% or more (for all wavelengths). Thereby, there can be provided a quarter-wave plate with uniform phase difference characteristics within a broad wavelength band such as the range from 380 nm to 820 nm (broadband characteristics) and with high light transmittance.

$$H=3.5\times f-5.65\times n_{min}+8.55+\alpha \quad (1)$$

$(-0.35 \leq \alpha \leq +0.35)$

In the expression above, $n_{min}$ represents a refractive index of the base member for the shortest wavelength in the working wavelength range. In the present embodiment, structural period P of the ridge and trough periodic structure is restricted by $\lambda_{min}/2<P<\lambda_{min}$. Further, filling factor f (=L/P) can be selected so that a desired phase difference may be obtained, and it is preferable that the value of f is within a range of $0.6 \leq f \leq 0.75$ as a processing-realizable range.

Figure 3:
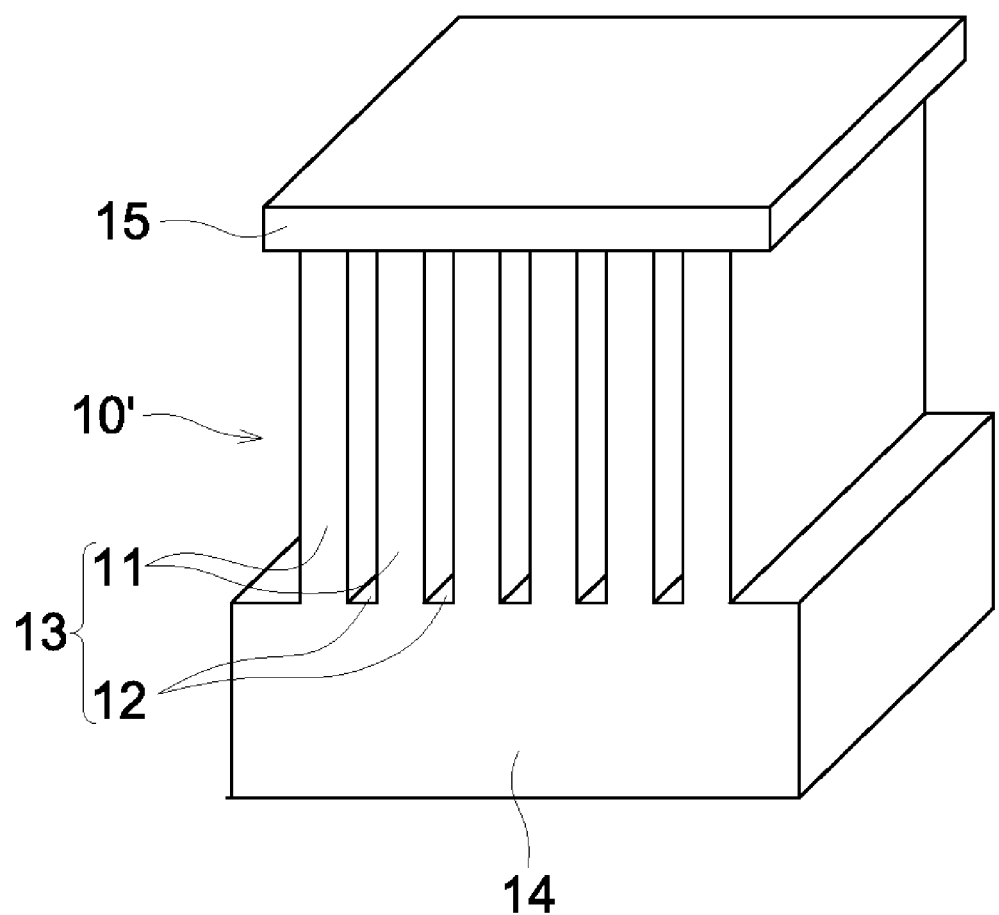
FIG. 3 is a perspective view of primary parts showing an example wherein a cover member is arranged on the upper portion of the ridge and trough periodic structure of the quarter-wave plate in FIG. 1.

An example of a variation of the present embodiment will be explained as follows, referring to FIG. 3. FIG. 3 is a perspective view of primary parts showing an example that a cover member is arranged on the upper portion of the ridge and trough periodic structure of the quarter-wave plate in FIG. 1.

Form birefringence quarter-wave plate 10' shown in FIG. 3 is basically the same as that in FIG. 1 in terms of a shape. However, cover member 15 that is made of material whose refractive index is different from that of the base member 14 is arranged on the upper part of the ridge and trough periodic structure section 13, so that the whole of the ridge and trough periodic structure section 13 may be covered by the cover member 15. Owing to this, an effect of antireflection on the upper part of the ridge and trough periodic structure section 13 and an antifouling effect of ridge and trough periodic structure section 13 can be expected.

When expecting an effect of antireflection for improving transmittance of the zeroth-order light, for example, the cover member 15 can be made by depositing $SiO_2$ with an appropriate thickness. Alternatively, it is also possible to employ a multiple-layered coating wherein some layers of different materials are superposed. In addition, the cover member can be made through an appropriate method suitable for the material of the cover member 15. In the meantime, the refractive index of $SiO_2$ is 1.470 (for wavelength 405 nm), 1.452 (for wavelength 650 nm) and 1.449 (for wavelength 780 nm).

Further, it is also possible to provide coating layer 16 that functions as an antireflection object on the other side of base member 14 as shown with broken lines in FIG. 1, for the quarter-wave plate of the present embodiment. The coating layer 16 can be formed, for example, to have an appropriate thickness through deposition with $SiO_2$ as stated above. Another ridge and trough periodic structure may be provided for antireflection alternatively, and an example of the ridge and trough periodic structure having an effect of such antireflection is a sub-wavelength antireflection diffraction grating wherein conic structures or pyramidal structures are arranged in a period of a wavelength or less. A transmittance of the zeroth-order light can be improved by the antireflection. Incidentally, it is also possible to provide the aforesaid coating layer 16 or the ridge and trough periodic structure on the other side of base member 14 of quarter-wave plate 10' shown in FIG. 3.

According to the quarter-wave plate of the present embodiment, as stated above, each dimension of the ridge and trough periodic structure is formulated to develop a uniform phase difference characteristics and to obtain high transmittance, in a broad wavelength band of 380 nm-820 nm, by the use of an ridge and trough periodic structure in which structural period P is within a range of $\lambda_{min}/2<P<\lambda_{min}$. Thereby, it is possible to obtain a ridge and trough periodic structure with greater structural period P and lower structural height H in comparison with a conventional wavelength plate. The foregoing makes manufacture to be easier than that in the past, and an ridge and trough periodic structure can be efficiently produced by utilizing, for example, injection molding or a nano-imprinting method.

For example, in the aforesaid Patent Document 1, a structural period is made to be a half or less of a wavelength of light, and there is given a structure having a structural period of 200 nm, a duty ratio of 0.64 and a structural height of 6000 nm. Manufacture of that structure is extremely difficult because its aspect ratio is great in particular. On the other hand, a range of dimensions of the ridge and trough periodic structure in the present embodiment exhibits greater structural period and lower structural height than the structure in the Patent Document 1, thus, the aspect ratio in the present embodiment is not great and processing of the ridge and trough periodic structure is easy.

Further, in the Patent Document 1 in which a wavelength plate coping with two wavelengths with the aforesaid structural period dimensions has been realized, it is difficult for an optical disc device to have uniform phase difference characteristics in a broader wavelength band required in recent years including, for example, 405 nm, 650 nm and 780 nm (three wavelengths compatibility for high density optical disc, DVD and CD). However, in the present embodiment, it is possible to develop uniform phase difference characteristics in a broader wavelength band covering 380 nm-820 nm. Owing to this, a single wavelength plate element can be provided as a wavelength plate, while a wavelength plate have been needed for each wavelengths in the past. Thereby, the number of parts of an optical disc device can be reduced.

EXAMPLES

Next, the invention will be explained more specifically as follows, referring to the example, to which, however, the invention is not limited by the explanation.

Wavelength plates grouped into Examples 1-5 and Comparative Examples 1-5 have respective structural dimensions (see FIG. 1) such as structural period P, filling factor $f(=L/P)$ and structural height H which are shown in the following Table 1. Each group was evaluated in terms of transmittance of the zeroth-order light and of phase difference.

ZEONEX (made by ZEON Corporation) was used as a resin material of the wavelength plate for each of Examples 1-5 and Comparative Examples 1-5, and refractive indexes thereof were as follows.

$n_{405}=1.525$ (for wavelength 405 nm)
$n_{650}=1.506$ (for wavelength 650 nm)
$n_{780}=1.505$ (for wavelength 780 nm)

In Table 1, the symbol with a circle "○" in column *1 indicates that the aforesaid expression (1) is satisfied, and a symbol with a cross "X" indicates that the aforesaid expression (1) is not satisfied. Further, overall judgment *2 was carried out such that those satisfying all of the following items are represented by the symbol with a circle "○", and those which do not satisfy at least any one of the following items are represented by a symbol with a cross "X":

(1) Respective transmittances of zeroth-order light for $\lambda=405$ nm, 650 nm and 780 nm are 85% or more;

(2) Phase difference $\Phi_{405}$ for $\lambda=405$ nm is within $90\pm3$ [deg];

(3) Phase difference $\Phi_{650}$ for $\lambda=650$ nm is within $90\pm10$ [deg].

(4) Phase difference $\Phi_{780}$ for $\lambda=780$ nm is within $90\pm15$ [deg].

The Table 1 shows that structural periods P of Examples 1-5 and of Comparative Examples 1-5 are all within a range of $\lambda_{min}/2<P<\lambda_{min}$ under the condition of $\lambda_{min}=405$ nm. The Table 1 further shows that Comparative Examples 1-5 which does not satisfy the expression (1) provide a transmittance of the zeroth-order light or a phase difference which does not satisfy the aforesaid condition, and that the Examples 1-5 which satisfy the expression (1) provide a transmittance of the zeroth-order light and a phase difference which satisfy the aforesaid condition.

Next, wavelength plates grouped into Examples 6-10 and Comparative Examples 6-10 have respective structural dimensions (see FIG. 1) such as structural period P, filling factor $f(=L/P)$ and structural height H which are shown in the following Table 2. Each group was evaluated in terms of transmittance of the zeroth-order light and of phase difference. Incidentally, APEL (made by Mitsui Chemicals Inc.) was used as a resin material of the wavelength plate for each of Examples 6-10 and Comparative Examples 6-10, and refractive indexes thereof were as follows.

$n_{405}=1.560$ (for wavelength 405 nm)
$n_{650}=1.541$ (for wavelength 650 nm)
$n_{780}=1.537$ (for wavelength 780 nm)

TABLE 1

|  | Expression (1)*1 | P [μm] | f | H [μm] | $T_{405}$ | $T_{650}$ | $T_{780}$ | $\Phi_{405}$ [deg] | $\Phi_{650}$ [deg] | $\Phi_{780}$ [deg] | Overall judgment*2 |
|---|---|---|---|---|---|---|---|---|---|---|---|
| Example 1 | ○ | 0.39 | 0.63 | 2.08 | 90.83% | 97.45% | 97.51% | 89.13 | 91.49 | 80.25 | ○ |
| Example 2 | ○ | 0.32 | 0.72 | 2.12 | 95.66% | 97.59% | 97.45% | 92.51 | 83.95 | 75.52 | ○ |
| Example 3 | ○ | 0.34 | 0.75 | 2.46 | 85.44% | 97.06% | 97.62% | 92.30 | 89.40 | 80.15 | ○ |
| Example 4 | ○ | 0.37 | 0.60 | 1.88 | 92.94% | 97.74% | 97.68% | 90.56 | 89.26 | 77.95 | ○ |
| Example 5 | ○ | 0.40 | 0.69 | 2.36 | 92.48% | 97.75% | 97.29% | 87.35 | 88.31 | 81.46 | ○ |
| Comp. 1 | X | 0.39 | 0.63 | 1.76 | 65.15% | 97.44% | 97.25% | 66.74 | 76.90 | 67.71 | X |
| Comp. 2 | X | 0.30 | 0.69 | 1.98 | 90.43% | 97.32% | 97.73% | 106.10 | 86.06 | 75.05 | X |
| Comp. 3 | X | 0.32 | 0.75 | 2.18 | 93.45% | 97.06% | 97.74% | 92.96 | 80.98 | 72.45 | X |
| Comp. 4 | X | 0.35 | 0.66 | 1.86 | 80.73% | 97.80% | 97.68% | 85.41 | 81.03 | 72.00 | X |
| Comp. 5 | X | 0.40 | 0.57 | 1.56 | 93.55% | 97.70% | 97.46% | 87.18 | 75.66 | 65.31 | X |

Comp.: Comparative Example

TABLE 2

| | Expression (1)*1 | P [μm] | f | H [μm] | $T_{405}$ | $T_{650}$ | $T_{780}$ | $\Phi_{405}$ [deg] | $\Phi_{650}$ [deg] | $\Phi_{780}$ [deg] | Overall judgment*2 |
|---|---|---|---|---|---|---|---|---|---|---|---|
| Example 6 | ○ | 0.31 | 0.75 | 2.04 | 94.59% | 97.32% | 96.84% | 92.91 | 84.89 | 75.63 | ○ |
| Example 7 | ○ | 0.34 | 0.72 | 2.20 | 86.53% | 96.67% | 97.48% | 92.00 | 94.90 | 84.19 | ○ |
| Example 8 | ○ | 0.36 | 0.60 | 1.70 | 85.81% | 97.62% | 97.69% | 92.41 | 88.60 | 78.08 | ○ |
| Example 9 | ○ | 0.38 | 0.63 | 1.92 | 85.68% | 97.64% | 97.60% | 92.24 | 92.45 | 84.25 | ○ |
| Example 10 | ○ | 0.40 | 0.69 | 2.38 | 89.01% | 97.00% | 96.89% | 87.87 | 97.86 | 91.48 | ○ |
| Comp. 6 | X | 0.30 | 0.72 | 1.86 | 92.02% | 97.28% | 97.58% | 96.18 | 83.73 | 75.07 | X |
| Comp. 7 | X | 0.33 | 0.69 | 1.74 | 85.89% | 97.06% | 96.82% | 91.72 | 81.46 | 70.66 | X |
| Comp. 8 | X | 0.34 | 0.63 | 1.56 | 84.46% | 97.46% | 97.56% | 80.93 | 81.10 | 70.53 | X |
| Comp. 9 | X | 0.40 | 0.66 | 2.42 | 70.19% | 96.81% | 96.83% | 89.24 | 106.96 | 98.82 | X |
| Comp. 10 | X | 0.35 | 0.51 | 1.14 | 94.22% | 98.26% | 97.83% | 89.72 | 69.34 | 57.00 | X |

Comp.: Comparative Example

In Table 2, a symbol with circle "○" in the column *1 indicates that the aforesaid expression (1) is satisfied, and a symbol with cross "X" indicates that the aforesaid expression (1) is not satisfied. Further, overall judgment *2 was carried out in the same way as in Table 1.

The Table 2 above shows that structural periods P of Examples 6-10 and of Comparative Examples 6-10 are all within a range of $\lambda_{min}/2<P<\lambda_{min}$ under the condition of $\lambda_{min}=405$ nm. The Table 2 further shows that Comparative Examples 6-10 which do not satisfy the expression (1) provide a transmittance of the zeroth-order light or a phase difference which does not satisfy the aforesaid condition, and that the Examples 6-10 which satisfy the expression (1) provide a transmittance of the zeroth-order light and a phase difference which satisfy the aforesaid condition.

There have been explained the best mode for carrying out the invention and the example of the invention, to which, however, the invention is not limited, and various modifications can be made without departing from the technical spirit and scope of the invention. For example, the quarter-wave plate 10 can be used so that a light flux may enter from any of the upper portion and the lower portion in FIG. 1, and it is possible to obtain an effect of antireflection by arranging coating layer 16 as shown by broken lines in FIG. 1.

In the same way, quarter-wave plate 10' in FIG. 3 can be used so that a light flux may enter from any of the upper portion and the lower portion in FIG. 3, and it is possible to obtain an effect of antireflection by cover member 15.

Figure 4:
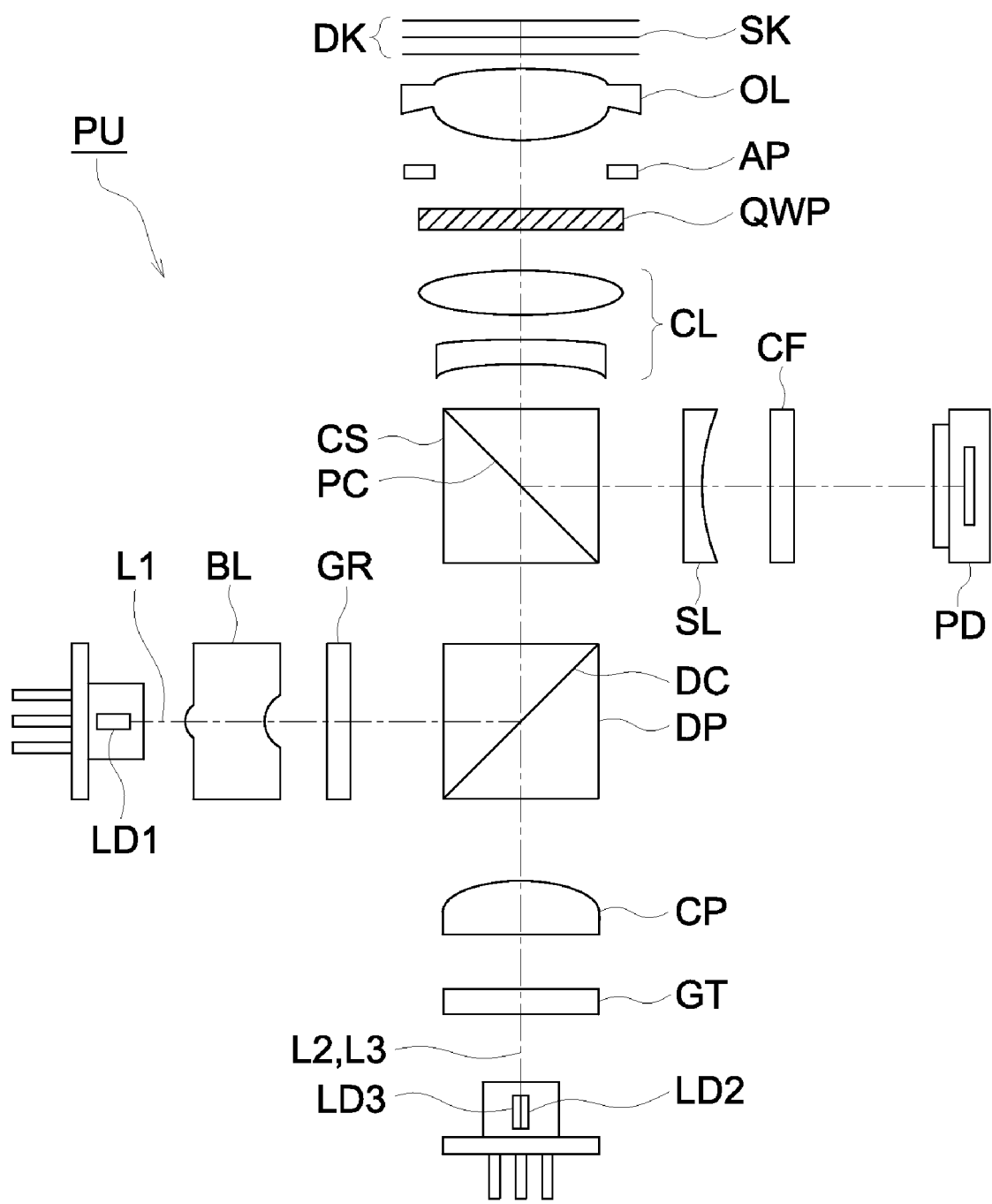
FIG. 4 is a diagram schematically showing an example of the structure of an optical pickup device that is equipped with a form birefringence quarter-wave plate relating to the present embodiment.

FIG. 4 is a diagram schematically showing an example of the structure of an optical pickup device that is equipped with a form birefringence quarter-wave plate relating to the present embodiment. FIG. 4 shows a so-called 3-wavelength compatible optical pickup device capable of recording and reproducing information properly for any of a high density optical disc, DVD and CD. In the meantime, in the present example, BD (Blu-Ray disc) is used as an example of a high density optical disc for the explanation. Alternatively, HD DVD (high definition DVD) may also be used, without being limited to BD.

Optical pickup device PU shown in FIG. 4 is composed of violet laser light source LD1 for BD, red laser light source LD2 for DVD, infrared laser light source LD3 for CD, light-receiving element PD representing a photodetector for common use for BD/DVD/CD, objective optical system OL, collimating optical system CL, polarization beam splitter CS, optical path compound prism DP, form birefringence quarter-wave plate QWP relating to the invention explained above, and of sensor optical system SL for giving astigmatism to reflected light coming from information recording surface of each optical disc.

As the specifications of BD, thickness t of protective substrate PL1 is 0.1 mm, numerical aperture NA is 0.85 and working wavelength is 400 nm±20 nm (for example, 405 nm). As the specifications of DVD, thickness t of protective substrate PL2 is 0.6 mm, numerical aperture NA is 0.65 and working wavelength is 650 nm±20 nm (for example, 650 nm). As the specifications of CD, thickness t of protective substrate PL3 is 1.2 mm, numerical aperture NA is 0.51 and working wavelength is 790 nm±30 nm (for example, 780 nm). However, combination of a wavelength, a thickness of a protective substrate and a numerical aperture is not limited to the foregoing.

Out of three laser light sources LD1-LD3 shown in FIG. 4, red laser light source LD2 and infrared laser light source LD3 are packed in a common package to be close to each other. In the meantime, three laser light sources LD1-LD3 are controlled so that two or more of them may not be caused to emit light simultaneously.

Light beam L1 is emitted from violet laser light source LD1 representing a light source for BD, to be divergent and be in an oval-shaped light intensity distribution. The beam is formed by beam forming element BL to be in light intensity distribution that is preferable for recording and reproducing information.

Light beam L1 formed by beam forming element BL enters diffraction grating GR for conducting tracking operation in a DPP method or a three-beam method, and it is divided into a main beam (zeroth-order light) for conducting recording/reproducing information for optical disc DK and into two sub-beams (first order light, omitted in FIG. 4). Light beam (main beam) L1 emerged from diffraction grating GR enters optical path compound prism DP.

On the other hand, light beam L2 is emitted from red laser light source LD2 representing a light source for DVD, to be divergent and be in an oval-shaped light intensity distribution. The beam enters diffraction grating CT for conducting tracking operation in DPP method or in 3-beam method, and is divided into a main beam (zeroth-order light) for conducting recording/reproducing information for optical disc DK and into two sub-beams (±first-order light which is omitted in FIG. 4) for detecting tracking errors. Light beam L3 is emitted from red laser light source LD3 representing a light source for DVD, to be divergent and be in an oval-shaped light intensity distribution. The beam enters diffraction grating GT for conducting tracking operation in DPP method or in 3-beam method, and is divided into a main beam (zeroth-order light) for conducting recording/reproducing information for optical disc DK and into two sub-beams (±first-order light which is omitted in FIG. 4) for detecting tracking errors. Then, each of light beams (main beams) L2 and L3 emitted from diffraction grating GT enters coupling lens CP. Each of the light beams (main beams) L2 and L3 is converted in terms of an angle of divergence in the coupling lens CP, and then, enters the optical path compound prism DP. Incidentally, when a polarization angle of the light beam L1 is perpendicular to that of the light beams L2 and L3, a half-wave plate is arranged on an optical path of either one of the light beams.

The optical path compound prism DP has the structure wherein two glass prisms are pasted together through dichroic film DC that is composed of a multilayer optical membrane. The dichroic film DC has wavelength selectivity so as to reflect the light beam L1 in a wavelength-band of wavelength 405 nm, and to pass through the light beam L2 in a wavelength-band of wavelength 650 nm and the light beam L3 in a wavelength-band of wavelength 780 nm. The optical paths of three light beams L1-L3 is combined by the optical path compound prism DP, thereby, each of three light beams L1-L3 enters the polarization beam splitter CS through a common path.

The dichroic film DC provided on the optical path compound prism DP may have wavelength selectivity so as to transmit the light beam L1 in a wavelength-band of wavelength 405 nm, and to reflect the light beam L2 in a wavelength-band of wavelength 650 nm and the light beam L3 in a wavelength-band of wavelength 780 nm. What is required in this case is replacement between the optical path for the blue laser light source LD1 and the optical path for the red laser light source LD2 and the infrared laser light source LD3. Incidentally, it is assumed that three light beams L1-L3 which enter the polarization beam splitter CS from the optical path compound prism DP are of P polarization.

The polarization beam splitter CS is an optical path branching device having polarization separating film PC composed of a multilayer optical membrane between two transparent triangular prisms serving as a substrate. The polarization separating film PC has polarization separating characteristics in which most of P polarization components of an incident light flux are transmitted and most of S polarization components are reflected. Under this condition, polarization directions of light beams L1-L3 to the polarization separating film PC are of P polarization. Therefore, most of light beams L1-L3 enters the polarization separating film PC are transmitted, and whereby, optical paths from respective laser light sources LD1-LD3 to optical disc DK are formed.

Each of light beams L1-L3 which have passed through the polarization beam splitter CS enters collimating optical system CL. The collimating optical system CL converts each of the entering light beams L1-L3 into an almost parallel beam. This collimating optical system CL has the two-group two-element structure having a convex lens and a concave lens with an air space interposing between both lenses, and the air space is variable by a one-dimensional actuator (not shown). It is possible to adjust wavefront aberration caused due to an error of a substrate thickness of optical disc DK, by changing the air space and changing angles of divergence for each of emitted light beams L1-L3. Each of the light beams L1-L3 converted by collimating optical system CL into almost parallel beams is converted into circularly polarized light by the aforesaid form birefringence quarter-wave plate QWP (corresponding to element 10 in FIG. 1 or element 10' in FIG. 3). Then, each light beam enters objective optical system OL of a wavelength compatible type having an excellent image forming performance concerning the aforesaid three wavelengths, after passing through aperture stop AP. Then, each light beam is formed into an image as a light spot on information recording surface SK of optical disk DK.

The objective optical system OL is movable for focusing and tracking operations for each optical disc, by two-dimensional actuator (not shown). Though the objective optical system OL is shown as a single lens in FIG. 4, the invention is not limited to this. The objective optical system OL is may be provided by combining two or more optical elements, for example. It is also possible to employ the so-called plural lens types wherein plural lenses are prepared and the lenses are mechanically switched for respective objective optical discs.

Each of the light beams L1-L3 formed into an image on information recording surface SK is reflected on information recording surface SK to become reflected light for returning, and each passes through objective lens OL, aperture stop AP, form birefringence quarter-wave plate QWP and collimating optical system CL, and returns to polarization beam splitter CS. Since each of the light beams L1-L3 passes through form birefringence quarter-wave plate QWP on the way back to the polarization beam splitter CS, each enters polarization separating film PC as S-polarized light. By the reflection of components of this S-polarized light, an optical path from optical disc DK to light-receiving element PD is formed. Therefore, each of the light beams L1-L3 reflected on polarization beam splitter CS passes through sensor optical system SL composed of cylindrical lenses and optical filter CF, and is converged on light-receiving element PD of a signal system. Then, optical information included in each of the light beams L1-L3 is detected by the light-receiving element PD.

Optical filter CF arranged between polarization beam splitter CS and light-receiving element PD is a filter to adjust an amount of transmitted light for a wavelength-band of wavelength 405 nm, a wavelength-band of wavelength 650 nm and a wavelength-band of wavelength 780 nm. It changes an amount of transmitted light for light beams L1-L3 depending on wavelength so that an amount of transmitted light for a wavelength-band of wavelength 650 nm and a wavelength-band of wavelength 780 nm may be brought near to an amount of transmitted light for a zone of wavelength 405 nm. Adjustment of the amount of transmitted light controls a light amount for all of the light beams L1-L3 to be in a dynamic range of light-receiving element PD.

By employing form birefringence quarter-wave plate providing uniform phase difference characteristic in a wide wavelength band despite working wavelength that varies greatly, and providing high transmittance for each wavelength on a three wavelength compatible optical pickup device, despite of working wavelengths being greatly different from each other, it is possible to obtain an optical pickup device wherein light loss is less and utilization efficiency is high.

Though there has been explained an example employing a three-wavelength-compatible optical pickup device on which a form birefringence quarter-wave plate relating to the present embodiment by using FIG. 4, the invention is not limited to this embodiment. For example, an embodiment is available such that there are arranged two optical path compound prisms each having wavelength selectivity and three laser light sources corresponding to respective wavelengths and that each light which enters the polarization beam splitter has the same polarization state as others. Further, it is naturally possible to employ various types of variations for arrangement of optical members which compound light beams. Further, the invention naturally provides an optical pickup device having compatibility for two wavelengths, for example, such as a combination of a violet laser light source and an infrared laser light source, and a combination of a violet laser light source and a red laser light source.

The invention claimed is:

1. A quarter-wave plate which transmits a plurality light fluxes with wavelengths that are different from each other, the quarter-wave plate comprising:
 a base member comprising a ridge and trough periodic structure with a structural period of $\lambda_{min}/2<P<\lambda_{min}$ arranged on one side of the base member, where $\lambda_{min}$ is a minimum wavelength among the plurality of wavelengths,
 wherein a refractive index $n_{min}$ of a ridge portion of the ridge and trough periodic structure for the wavelength $\lambda_{min}$ satisfies $1.5<n_{min}<1.6$,
 wherein a light transmittance of the quarter-wave plate for the wavelength $\lambda_{min}$ is 85% or more,
 wherein the ridge and trough periodic structure satisfies the expression (1):

$$H=3.5\times f-5.65\times n_{min}+8.55+\alpha \quad (1)$$

$(-0.35<\alpha<+0.35)$
 where P is a structural period of the ridge and trough periodic structure, H is a structural height (μm) of the ridge portion, L is a structural width of the ridge portion, and f is a filling factor (=L/P),
 wherein the structural period P is 0.31 um or more, and
 wherein each of the plurality of wavelengths is within a range of 380 nm to 820 nm.

2. The quarter-wave plate of claim 1, wherein the filling factor (f) is at least 0.6 and not more than 0.75.

3. The quarter-wave plate of claim 1, wherein the ridge portion of the ridge and trough periodic structure comprises a resin.

4. The quarter-wave plate of claim 1, wherein a trough portion of the ridge and trough periodic structure comprises air.

5. The quarter-wave plate of claim 1, further comprising:
 a cover member arranged on the ridge and trough periodic structure, the cover member having a refractive index that is different from the refractive index of the ridge portion of the ridge and trough periodic structure.

6. The quarter-wave plate of claim 1, further comprising a second ridge and trough structure or a coating layer for antireflection, arranged on another side of the base member that is opposite from the one side.

7. An optical pickup device comprising:
 a light source for emitting a plurality of light fluxes with wavelengths that are different from each other;
 an objective lens for converging each of the light fluxes emitted by the light source onto a recording surface of an information recording medium;
 a light-receiving element for receiving a light flux reflected by the recording surface of the information recording medium; and
 a quarter-wave plate arranged between the objective lens and the light-receiving element, the quarter-wave plate comprising a base member comprising a ridge and trough periodic structure with a structural period of $\lambda_{min}/2<P<\lambda_{min}$ arranged on one side of the base member, where $\lambda_{min}$ is a minimum wavelength among the plurality of wavelengths,
 wherein a refractive index $n_{min}$ of a ridge portion of the ridge and trough periodic structure for the wavelength $\lambda_{min}$ satisfies $1.5<n_{min}<1.6$,
 wherein a light transmittance of the quarter-wave plate for the wavelength $\lambda_{min}$ is 85% or more,
 wherein the ridge and trough periodic structure satisfies the expression (1):

$$H=3.5\times f-5.65\times n_{min}+8.55+\alpha \quad (1)$$

$(-0.35<\alpha<+0.35)$
 where P is a structural period of the ridge and trough periodic structure, H is a structural height (μm) of the ridge portion, L is a structural width of the ridge portion, and f is a filling factor (=L/P),
 wherein the structural period P is 0.31 μm or more, and
 wherein each of the plurality of wavelengths is within a range of 380 nm to 820 nm.

8. The optical pickup device of claim 7, wherein each of the plurality of wavelengths is within 400 nm±20 nm, 650 nm±20 nm, or 790 nm±30 nm.

9. The optical pickup device of claim 7, wherein the filling factor (f) is at least 0.6 and not more than 0.75.

10. The optical pickup device of claim 7, wherein the ridge portion of the ridge and trough periodic structure comprises a resin.

11. The optical pickup device of claim 7, wherein a trough portion of the ridge and trough periodic structure comprises air.

12. The optical pickup device of claim 7, further comprising:
 a cover member arranged on the ridge and trough periodic structure, the cover member having a refractive index that is different from the refractive index of the ridge portion of the ridge and trough periodic structure.

13. The optical pickup device of claim 7, further comprising a second ridge and trough structure or a coating layer for antireflection, arranged on another side of the base member that is opposite from the one side.

* * * * *